Figure 1:
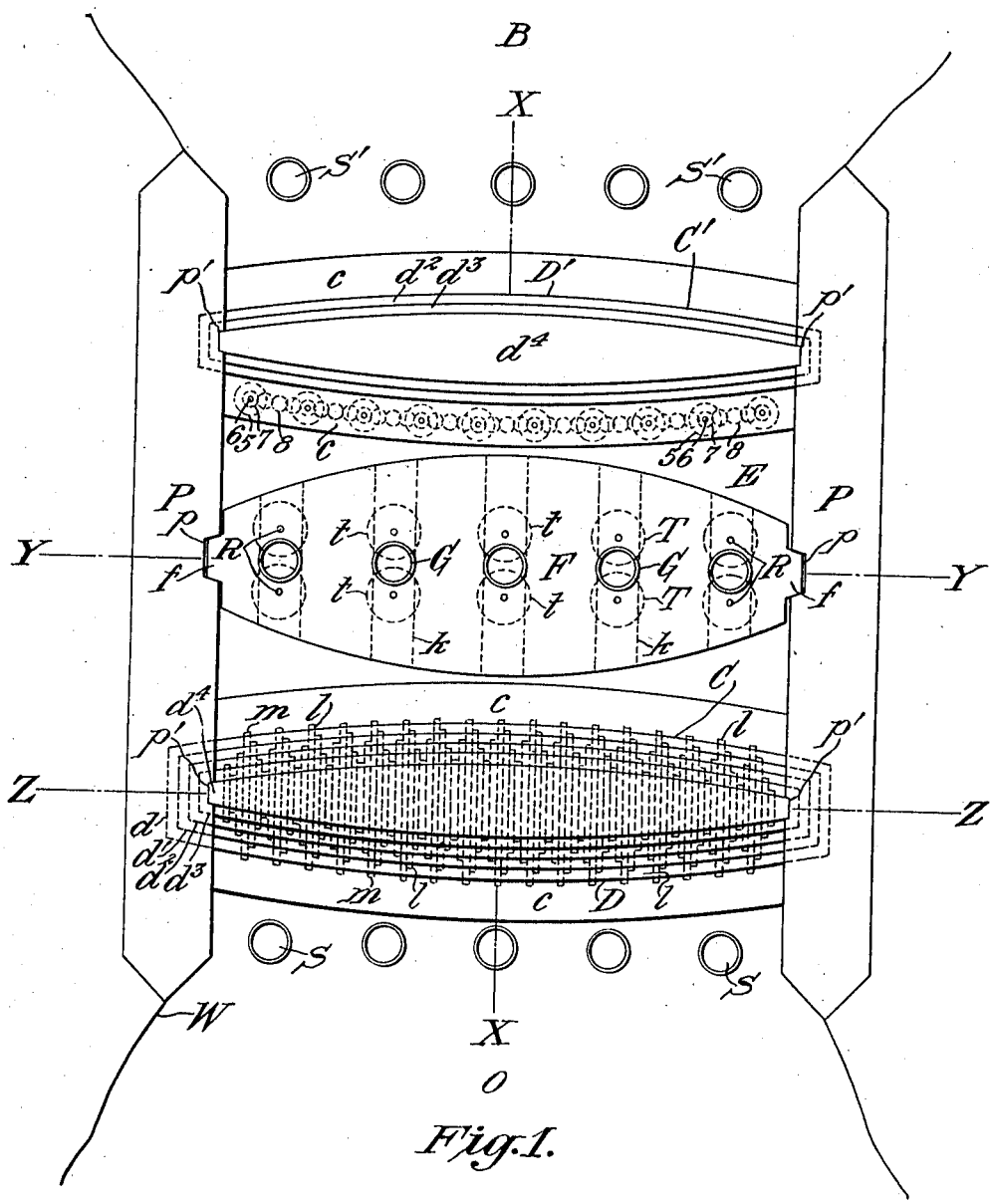

C. H. TALMAGE.
TIDAL POWER PLANT.
APPLICATION FILED OCT. 5, 1917.

1,313,965.

Patented Aug. 26, 1919.
3 SHEETS—SHEET 1.

C. H. TALMAGE.
TIDAL POWER PLANT.
APPLICATION FILED OCT. 5, 1917.

1,313,965.

Patented Aug. 26, 1919.
3 SHEETS—SHEET 2.

INVENTOR
C. H. Talmage
BY
ATTORNEY

C. H. TALMAGE.
TIDAL POWER PLANT.
APPLICATION FILED OCT. 5, 1917.

1,313,965.

Patented Aug. 26, 1919.
3 SHEETS—SHEET 3.

INVENTOR
C. H. Talmage
BY
Arthur A. Armington
ATTORNEY

UNITED STATES PATENT OFFICE.

CHARLES HERBERT TALMAGE, OF NEW BEDFORD, MASSACHUSETTS.

TIDAL-POWER PLANT.

1,313,965.

Specification of Letters Patent. Patented Aug. 26, 1919.

Application filed October 5, 1917. Serial No. 194,888.

*To all whom it may concern:*

Be it known that I, CHARLES HERBERT TALMAGE, a citizen of the United States, residing at New Bedford, in the county of Bristol, State of Massachusetts, have invented certain new and useful Improvements in Tidal-Power Plants, of which the following is a specification.

My invention relates to hydraulic power-plants and consists in an improved apparatus for developing power from tidal forces. The object of my improvement is to provide means for utilizing the energy of the tide flowing in either direction to develop a maximum amount of power therefrom during substantially continuous periods. Further objects of the improvement are to render the device reliable and efficient under variable conditions in the source of power and to provide for its practical and economical operation for indefinite periods.

The manner and means for carrying out the improvement are fully explained in the following specification, illustrated by the accompanying drawings, in which like reference characters designate like parts. In the drawings:—

Figure 2:
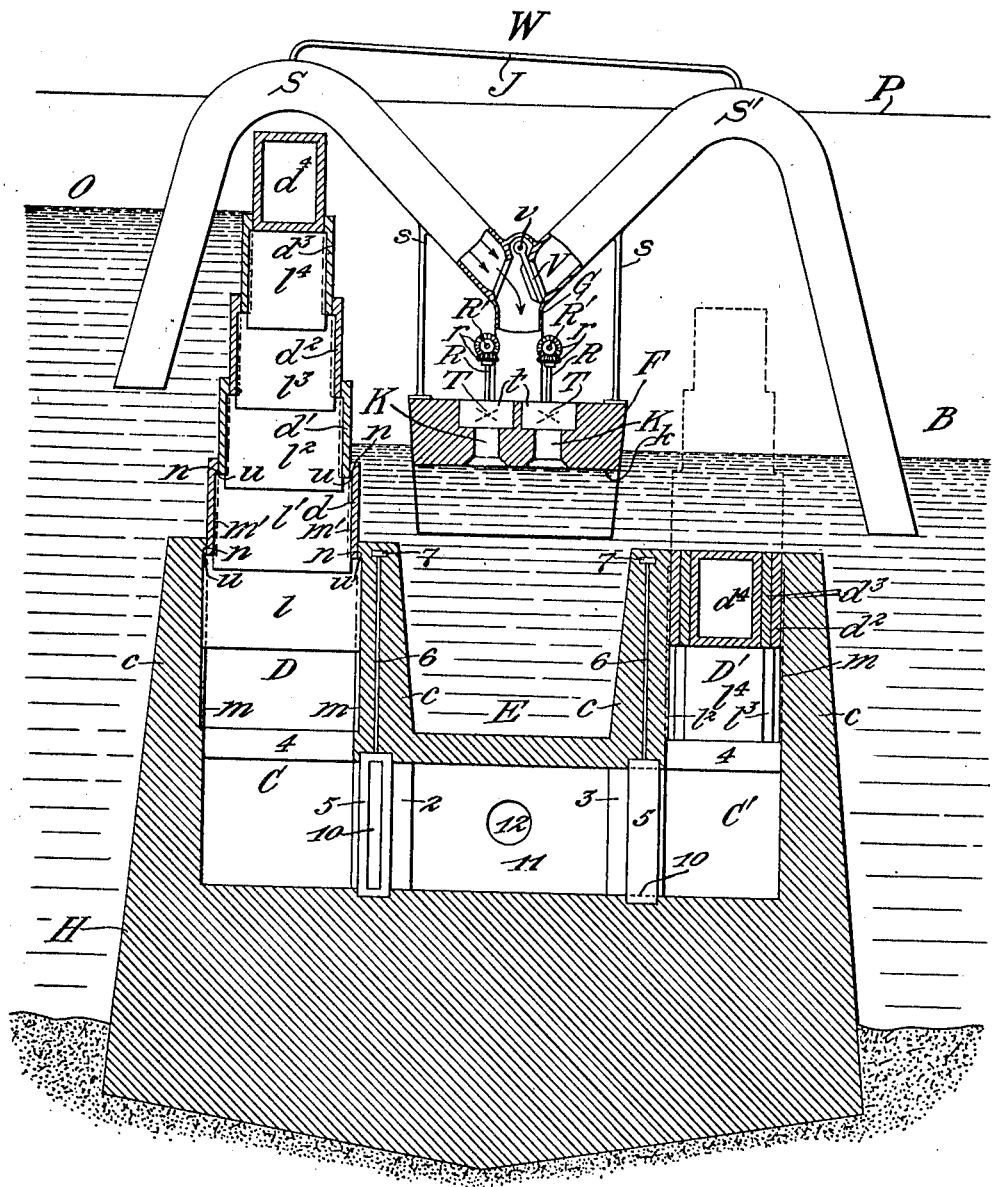
Figure 4:
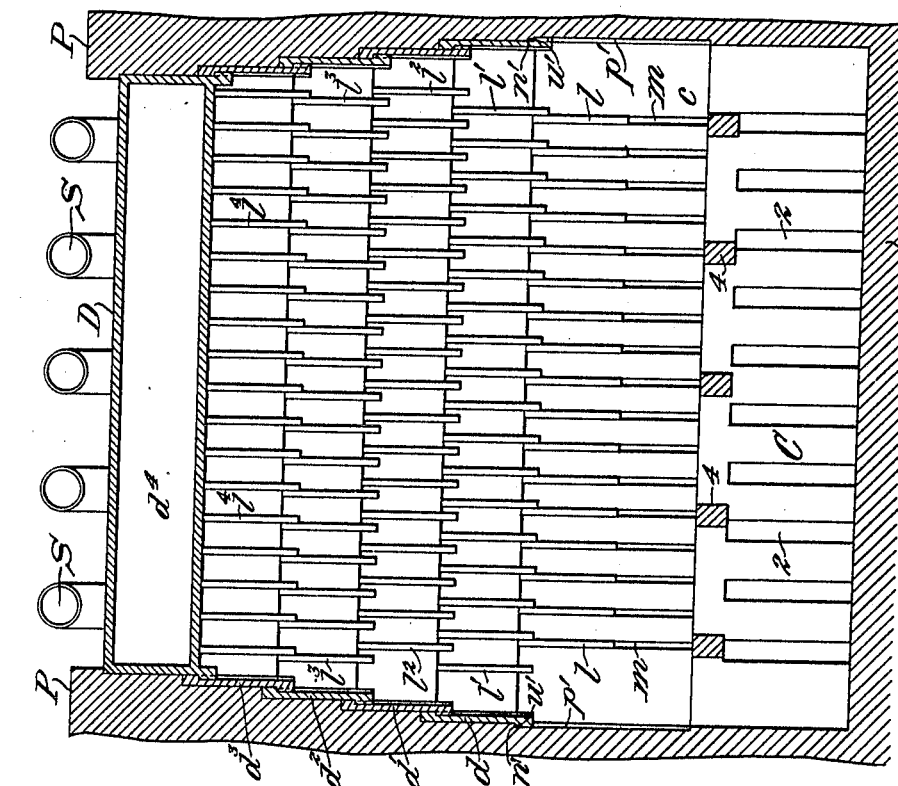
Figure 3:
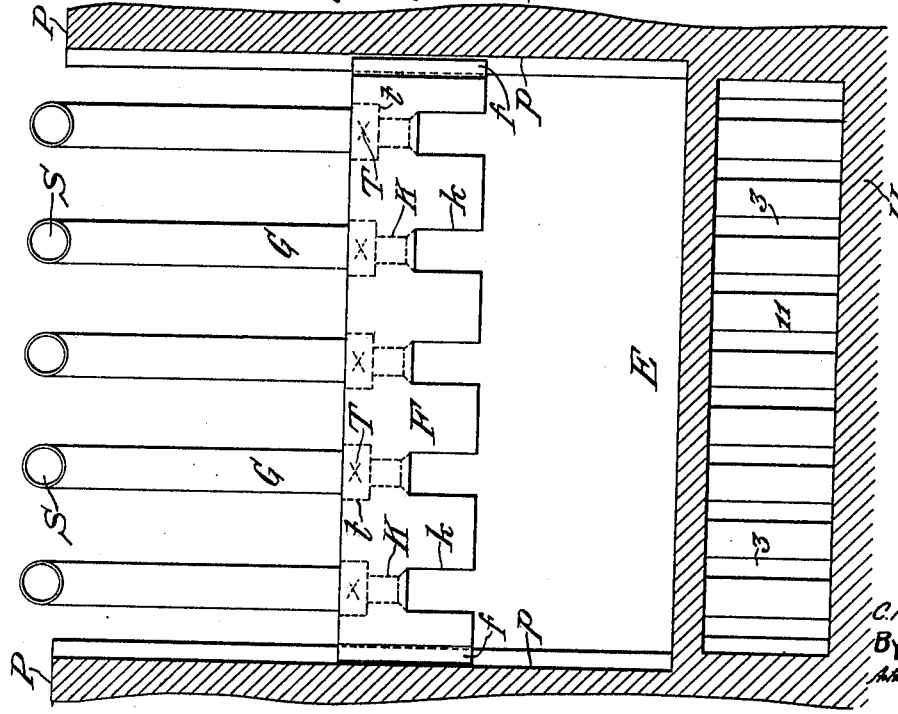

Figure 1 is a plan view of my improved power-plant showing it applied to the mouth of a tidal-basin;

Fig. 2, a cross-sectional view of the apparatus taken on the line X—X of Fig. 1;

Fig. 3, a sectional view on the line Y—Y of Fig. 1, showing the central float or supporting-bridge for the turbines in full; and Fig. 4, a sectional view of one of the telescopic dams taken on the line Z—Z of Fig. 1.

My improved power-plant may be installed at the mouth of any suitable river, bay or tidal-basin, and preferably is erected at a location where the rise and fall of the tide has a considerable range. Referring first to Fig. 1, I have here illustrated a relatively narrow tideway W leading from a tidal-basin or bay B to the sea or ocean as designated at O. The sides of the tideway W are lined with abutments or piers P, P, preferably constructed of masonry or concrete to render them strong and durable, and extending between them across the tideway is a concrete base or dam-foundation H, see Fig. 2. The foundation H is provided at either end with walled chambers C, C′ for the reception of two telescopic, collapsible dams D, D′. Between the inner walls of the dam-chambers C, C′ is a basin E for the reception of a buoyant bridge or float F which supports a series of water-motors or turbines T, T, etc. If desired the bridge F might be stationary, suspended across the tideway W from the abutments or piers P, P, but to obtain the maximum power-efficiency from the full, tidal force, I prefer to support it on the water in the basin E, as shown, to allow it to rise and fall with the tide in accordance with certain requirements as later explained. The float F is preferably substantially boat-shaped and at its ends are abutments *f, f* fitted to slide in vertical slots *p, p* in the walls of the piers P, P to guide its movement up and down in the basin E. If desired, the abutments and guiding-slots may be provided with rollers or anti-friction bearings for facilitating the movement of the float, but these are not herein shown as they are not essential to the operation of the device. The float F may be of any suitable construction as best adapted for the purpose intended, and in some cases may be provided with suitable compartments for water ballast to regulate its level, although this detail is not herein illustrated.

Fig. 1 illustrates ten turbines T spaced across the float F in pairs, but their number may be varied at will in accordance with power requirements or the space available in the tideway W. The water-wheels of the turbines T may be of any preferred construction and are inclosed in cylindrical casings *t* surmounted by standpipes G for the ingress of the water thereto. The power-shafts R of the turbines project vertically from the turbine-wheels and may be connected by gearing *r, r* to line-shafts R′, R′ arranged to drive dynamos or other generators, not herein shown. Leading into each standpipe G from opposite sides are two siphons S, S′ supported from the float F by stanchions or uprights *s, s*. The siphons S, S′ consist of V-shaped pipes extending across the top of the dams D, D′ with their lower ends reaching down into the sea O and tidal-basin B, respectively. At the point of joinder of the siphons with the standpipe G is a double-acting valve V adapted to close the mouth of either one of the pipes S, S'. The valves V of the whole series of siphons may be operated simultaneously from a single cross-shaft $v$ extending horizontally along the float F and adapted to be manipulated from suitable power- or manually-controlled mechanism, not herein shown or described. The two siphons S, S' of each set or pair are connected at their bends by a relatively small pipe J which leads to an air-pump and is provided with a system of valves whereby the air may be exhausted from either siphon to produce a vacuum therein. Below each turbine T is an outflow pipe or opening K for the egress of the water therefrom and these communicate with spillways or sluices $k, k$ extending laterally across the under side of the float F as indicated by the dotted lines in Fig. 1.

Referring now particularly to Figs. 1 and 2, the dam-chambers C, C' are formed by abutments or walls $c, c$ erected on the base or foundation H and extending across the tideway W between the piers P, P in somewhat arcuate shape, being bowed outwardly from each other at the center. The dams D and D' are composed of a series of telescoping sections $d, d'$, etc., of hollow construction, adapted to slide one within another. The several sections of each dam take the substantially boat-like form of the chambers C, C', being swelled out at the center to strengthen the structure and adapt it to resist the pressure of the water against its sides. Extending laterally across the bottom of each dam-section $d$ are a series of braces or bulkheads 1, 1', etc., as shown most clearly in Fig. 2. The bulkheads 1 of each section extend beneath its sidewalls to a distance substantially equal to the height thereof and serve as guides or runners between the sliding parts. The lowermost dam-section $d$ is fitted to the interior of the chamber C and the ends of its bulkheads $l$ slide in vertical grooves $m$ in the sides of its walls $c, c$. In the same manner, the next higher section $d'$ is arranged with the ends of its bulkheads 1' fitted to slide in grooves $m', m'$ on the interior of the section $d$, and so on throughout the whole series of dam-sections $d, d', d^2, d^3, d^4$. It will be noted that the dam D on the seaward side consists of five sections or telescopic parts, but on the opposite, basin side the dam D' has only three sections since it is not required to raise it to as high a level. In both dams the arrangement and method of coöperation of the sections are identical, however, so that it will not be necessary to describe each in detail. Where the bulkheads 1 join the bottom of the sections $d$ their guiding ends are offset from the sides thereof to form shoulders $n$, $n$, etc. The shoulders $n$ coöperate with abutments $u$ on the sides of the inclosing sections and serve as stops to limit the upward movement of one section in relation to another in the same manner as the sliding parts of a telescope are controlled. Referring particularly to Fig. 4, the dam-sections $d$ also have overlapping, shouldered portions $n'$ and $u'$ at their ends which coöperate for the same purpose. It is also to be noted that the openings $p'$ in the piers P, P in which the ends of the dam-sections slide, see Fig. 1, are offset or stepped inwardly toward the top so that when the dam is raised as shown in Fig. 4 its parts will form a substantially water-tight junction therewith. If desired the sliding joints between the several dam-sections and between their ends and the piers P, P may be provided with friction-reducing bearings, but in most instances their movement will be made sufficiently free by keeping them slushed with grease.

Referring to Figs. 2 and 4, it will be observed that all of the dam-sections $d$ except the uppermost one are open at the top and bottom. This allows for forcing a column of water into their interiors between their side-walls to raise the dams by hydraulic pressure. For this purpose the joints between the sections must be practically water-tight and to prevent leakage suitable packing is inserted between the overlapping parts although this detail of construction is not herein illustrated. The operation of raising and lowering the dams D, D' is controlled through a series of valved ports 2 and 3 at the bottom of the dam-chambers C, C'. The dam-sections $d$ when lowered do not descend clear to the bottom of the chambers C, C', but are held raised thereabove by a series of girders 4, 4. These latter extend across the chambers C, C' in spaced relation and are arranged to support the dam-sections by means of their bulkheads 1, 1' when the latter slide down thereagainst. Fitted to turn in the ports or openings 2 and 3 at the sides of the valve-chambers C, C' are cylindrical sleeve-valves 5, 5, etc., adapted to be operated from vertical, rotary shafts 6, 6. The shafts 6 extend upwardly through suitable openings in the side-walls $c, c$ and are connected to be rotated in unison by means of suitable power- or manually-operated mechanism as best adapted to the purpose. As indicated in Figs. 1 and 2, the shafts 6 carry gears 7 which mesh with idler pinions 8 to connect the several valves to be rotated simultaneously, all in the same direction. This may be accomplished by turning the end-shaft manually or under power through suitable mechanism not herein shown. If preferred, an articulated, horizontal shaft could be used for the same purpose, its sections being provided with screws or worms meshing with worm-wheels on the shafts 6. It will be understood, of course, that this mechanism would be arranged for operation from a suitable controlling-station or power-house located on one of the piers P, or in some cases where a fixed bridge or support is employed for the turbines T it might be controlled from a location thereon. As shown in Fig. 2 the valves 5 are provided with diametrically-extending lateral openings 10 which when turned to register with the ports 2 and 3 will permit the flow of water therethrough. Between the opposite port-walls of the chambers C, C' is a reservoir or storage tank 11 into which opens a supply-pipe 12. The pipe 12 leads from a suitable hydraulic pump, not here shown, and through this means water may be forced into the reservoir 11 to be admitted through either series of ports 2 or 3, as the case may be, to raise the dams D or D' in accordance with the system of operating the apparatus as next explained:

Assuming that the tide is commencing to rise or flow, the dam D on the seaward side is raised gradually to prevent the water from entering the tidal-basin B. This is accomplished by opening the valves 5 in the ports 2 leading to the dam-chamber C, while those in the ports 3 remain closed, and pumping the water therethrough to force it into the interior of the sections d. As the sections of the dam are thus filled with a column of water, the hydraulic pressure causes them to be telescopically extended or raised one above another until they reach the limit of their sliding movement as previously explained. After the dam D has been raised to its limit, the valves 5 are closed to confine the water within the sections d to maintain them in their extended relation. Usually the dam D is raised proportionately with the rise of the tide, and meanwhile the float F will also rise, due to the spill through the siphons into the basin B, but at a slower rate. Fig. 2 shows it at its maximum height which is slightly greater than the rise of the maximum or "spring" tides so as to provide a margin of safety at its top. At low tide the water will be at the same level on both sides of the dams and the height of the walls of the dam-chambers C, C' is designed to be slightly less than the lowest level of the tide for any season. Fig. 2 illustrates the apparatus with its parts in the position which they assume after the tide has risen to its maximum height, and at this point the turbine-float F will have been raised to some extent by the flow of the water through the siphons S. It is to be understood, however, that prior to this time, when the tide is at ebb, there will be a less depth of water in the basin B, and consequently the float F will be at a lower level. Starting at this point with the float F at its lowest level the mouth or ingress opening of the siphon S will be slightly above the surface of the water and there will be a relatively short interval when the turbines T are inoperative. As the tide rises, however, its level soon reaches the mouth of the pipe S and by exhausting the air from the pipe to create a vacuum therein the water is caused to siphon therethrough. It has already been explained that the vacuum in the siphons is obtained by exhausting the air from the pipes S, S' through the pipe J, the layout of the exhaust system not being herein shown or described in detail as it may be of any well known arrangement. In this way a continuous flow is induced through all of the whole series of siphons S into the standpipes G, thence through the turbines T to drive their wheels, whence the water exhausts through the pipes K into the sluiceways k. In this manner the turbines are operated to rotate their shafts R while the power is transmitted through the shafts R', R' to operate generators, or to drive other mechanism as may be required. As the tide continues to rise the flow through the siphons S raises the level of the water on the basin side of the dam, but its rise will be much slower than that of the tide on the ocean side. The flow through the siphons S therefore continues for some time after the tide has reached flood or during an initial period of its ebb. That is to say, after the tide starts to ebb the flow through the siphons S will be maintained up to a point where the level of the water on the ocean side has dropped nearly to the level of that on the basin side, or to that point where the difference in "head" equals the limit of use of the turbines. At this juncture the turbines will cease running and the sea-gate or dam D is now lowered by opening the valves 5 in the ports 2 at its base. The reservoir 11 is of sufficient capacity to receive the whole volume of water held in the dam D when the latter is elevated and hence as the water exhausts from the sections d through the ports 2 the dam will fall quickly by gravity. As the dam D is lowered the difference between the level of the water in the sea or ocean O and that in the basin B is immediately equalized and the other gate or dam D' is then raised to confine the water in the basin at substantially the level of the sea when work was stopped on the preceding run. The dam D' is raised by opening the valves 5 in the ports 3 and pumping the water therethrough in the same manner as in the case of the dam D, as previously explained, or, if desired, the hydraulic pressure could be furnished by connecting the chamber 11 with an elevated reservoir. In fact, any suitable system of causing pressure in the reservoir 11 and exhausting the water therefrom may be employed, the arrangement being so obvious that it is not herein shown or described in detail. The dam D' is composed of only three sections $d^2$, $d^3$, $d^4$, since it is not required to raise it to as high a level as that of the dam D, and when it is elevated to the position illustrated by the dotted lines in Fig. 2 its top will be well above the highest level of the water in the basin B at the maximum flood tide. After the dam D' has been raised it is held in position by closing the valves 5 to retain the water in its sections $d$. Meanwhile the double-acting valves V in the siphons will have been operated to close the pipes S and open the pipes S'. The falling sea will soon create a new "head" and a flow can then be induced through the siphons S' in the same manner as before described in connection with the opposite side of the apparatus, so that the turbines T will be turned to develop power which is transmitted through the shafts R, R' either for direct use or for storage as electrical current. As the water siphons out of the basin B the float F is gradually lowered, due to the fall of the tide on the ocean side which is unrestricted in the basin E after the dam D is lowered. The lowering of the float F maintains the mouth of the siphon S' constantly below the surface of the water in the basin B, and consequently the siphoning of the water therethrough will continue during the remainder of the ebb and throughout a portion of the rising tide. At this point the dam D' is lowered again to drain the basin B to the level of the sea, and thereafter the dam D is raised and the operation of the siphons reversed by shifting the position of the valves V.

As before explained, there will be a slight interval after the water has ceased siphoning out of the basin B before the tide will have risen sufficiently to cause the water to flow back through the siphon S. This period of inoperation is relatively brief, however, and if it is required to maintain the turbines running continuously, this may be accomplished through the use of a storage supply of water. In this way a continuous operation of the device could be provided for, although for most purposes, particularly where the power is employed for generating electricity, this is not required. In any event, however, it will be seen that my apparatus is so designed and arranged to operate that it will develop a maximum of power from the force and energy of the tidal flow with a minimum loss from friction or other natural causes affecting the mechanism and with practically no wastage of the water power. In addition the whole device is easy to install and operate while its capacity is only limited by the conditions of its natural location. That is to say, the apparatus may be extended and developed to the full capacity of any given location so that it may be employed for either small or large plants as, for instance, in developing power for either private industries or large municipalities. The controlling dams may be used in single units of pairs as shown, or extended in multiples, and in either case they are designed to operate with a minimum expenditure of power while being easy to control and quick in manipulation.

Various modifications could be made in the details of construction and method of operation of the parts of the apparatus without departing from the spirit or scope of the invention; therefore, without limiting myself to the exact embodiment shown and described, what I claim is:—

1. In a tidal-power plant, the combination with two adjacent collapsible dams, of a water-motor supported between the dams, and siphon-pipes leading from opposite sides of the dams to induce a current through the motor.

2. In a tidal-power plant, the combination with two adjacent adjustable dams, of a water-motor supported between the dams, siphon-pipes leading from opposite sides of the dams, and means to control the flow through the siphons to the motor.

3. In a tidal-power plant, the combination with two opposed collapsible dams, of hydraulic means for raising and lowering said dams, and a water-motor suspended between the dams to be operated by a current of water therethrough induced by the head caused by raising one dam and lowering the other during the ebb and flow of the tide.

4. In a tidal-power plant, the combination with opposite adjacent dams, of a water-motor supported between the dams, means to raise and lower said motor in accordance with the level of the water between the dams, and siphon-pipes leading from opposite sides of the dams to induce a current through the motor in either direction of flow of the tide.

5. In a tidal-power plant, the combination with a pair of collapsible dams, of means for independently raising and lowering the dams, a water-motor supported between the dams, means to raise and lower the motor in accordance with the level of the water between the dams, and siphon-pipes leading from opposite sides of the dams to induce a current through the motor.

6. In a tidal-power plant, the combination with a pair of collapsible dams, of means for independently raising and lowering the dams, a float supported in the basin between the dams, water-motors carried by said float, and siphon-pipes leading from opposite sides of the dams to induce a current through the motors in either direction of the flow of the tide.

7. In a tidal-power plant, the combination with spaced-apart collapsible dams, of means to independently raise and lower the dams, an adjustable support between the dams, a series of water-motors carried by said support, standpipes surmounting said motors, siphons leading from opposite sides of the dams to the standpipes, and double-acting valves for closing either one of each pair of siphons at its discharge end in the standpipe.

8. In a tidal-power plant, the combination with two opposite collapsible dams, of means for independently raising and lowering the dams, a series of water-motors supported between the dams, standpipes surmounting said motors, siphons leading from opposite sides of the dams to the standpipes, a double-acting valve in each pair of siphons, and means for operating all of the valves in unison for opening the siphons at one side and closing those on the other.

9. In a tidal-power plant, the combination with two opposite adjustable dams, of means for independently operating the dams, a float slidable vertically in guideways between the dams, a series of turbines carried by the float, siphons leading from opposite sides of the dams to the turbines, valves in the siphons, and means connecting all of the valves to be operated in unison to open the siphons on one side of the float while closing those on the opposite side.

10. In a tidal-power plant, the combination with two adjustable dams composed of telescoping sections, of means for raising and lowering the dams by hydraulic pressure, a series of water-motors supported in position between the dams, and siphons leading from opposite sides of the dams to induce a current through the motors in either direction in accordance with the level of the water on either side of the dam.

11. In a tidal-power plant, the combination with a telescopic dam composed of hollow sections slidable one within another, of means to force water into the sections to elevate the latter to raise the dam, a water-motor adjacent the dam, and a siphon for utilizing the pressure of the water held by the dam to induce a current through the motor.

12. In a tidal-power plant, the combination with a collapsible dam comprising a series of hollow telescopic sections slidable one within another, of means to guide the sections in their movement in relation to each other, means to limit the sliding movement of the sections, means to force a column of water into the sections to raise the dam, water-motors arranged adjacent the dam, and siphon pipes leading across the top of the dam to the motors.

13. In a tidal-power plant, the combination with a collapsible dam comprising a series of elongated hollow sections adapted to slide one within another, of bulkheads extending across the bottom of each section with their ends fitted in grooves in the sides of the inclosing section, means to extend the sections one in relation to another to raise the dam, water-motors arranged adjacent the side of the dam, and siphon pipes leading across the dam to the water-motors to cause a flow of water therethrough.

14. In a tidal-power plant, the combination with a collapsible dam constructed with an inclosing chamber at its base, of telescopic sections fitted to slide one within another to adapt them to be received in nested relation in the chamber, means to guide the sections in their sliding movement, means to limit the movement of the sections in relation to each other, means for forcing water into the chamber to extend the sections to raise the dam, water-motors arranged at the side of the dam, and siphon pipes leading across the dam to the water-motors to effect a flow of water therethrough.

15. In a tidal-power plant, the combination with a collapsible dam comprising hollow sections fitted to slide one within another, of a walled chamber for receiving the dam-sections in nested relation therein, valves at the base of the chamber for admitting water to raise the dam by hydraulic pressure, water-motors arranged at the side of the dam, and siphon pipes leading across the dam to the water-motors to effect a flow of water therethrough.

16. In a tidal-power plant, the combination with a collapsible dam comprising a series of hollow sections fitted to slide one within another, of a walled chamber for receiving the dam-sections in telescopic relation, ports at the side of the chamber, valves in said ports, means to operate the valves in unison to admit water to the chamber to raise the dam by hydraulic pressure, water-motors arranged at the side of the dam, and siphon pipes leading across the dam to the water-motors to induce a flow of water therethrough.

17. In a tidal-power plant for use in restricted tide-ways, the combination with abutments lining the sides of the tideway, of a foundation extending across the tideway between the abutments, elongated walled dam-chambers erected on said foundation, collapsible dams comprising hollow sections slidable in relation to each other to adapt them to telescope within the dam-chambers, means to admit water under pressure to the dam-chambers to raise the dams, and a series of water-motors arranged between the dams to adapt them to receive a flow of water from either side thereof.

18. In a tidal-power plant for use in restricted tideways, the combination with abutments lining the sides of the tideway, of a float extending between the abutments and slidable up and down thereon, a foundation extending across the bed of the tideway between the abutments, walled chambers surmounting the foundation, collapsible dams comprising sliding sections adapted to telescope within the chamber, a reservoir between the chambers, ports opening from the reservoir into the chambers, valves for closing said ports, water-motors on the float, and siphons leading from the opposite sides of the dams to the motors.

In testimony whereof I affix my signature.

CHARLES HERBERT TALMAGE.

Copies of this patent may be obtained for five cents each, by addressing the "Commissioner of Patents, Washington, D. C."